United States Patent
Senevirathne et al.

(10) Patent No.: US 7,672,228 B1
(45) Date of Patent: Mar. 2, 2010

(54) SYSTEM AND METHOD FOR NETWORK LOOP DETECTION AND RECOVERY

(75) Inventors: Tissa Senevirathne, Sunnyvale, CA (US); Vidyadhar Joshi, San Jose, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 1852 days.

(21) Appl. No.: 10/393,113

(22) Filed: Mar. 19, 2003

(51) Int. Cl.
*G01R 31/08* (2006.01)

(52) U.S. Cl. .................. 370/219; 370/224; 370/249; 709/209

(58) Field of Classification Search .......... 370/224, 370/217, 219, 221, 249; 709/209
See application file for complete search history.

(56) References Cited

U.S. PATENT DOCUMENTS

| | | | | |
|---|---|---|---|---|
| 5,563,875 A * | 10/1996 | Hefel et al. | | 370/249 |
| 6,023,563 A * | 2/2000 | Shani | | 709/249 |
| 6,580,715 B1 * | 6/2003 | Bare | | 370/396 |
| 6,587,904 B1 * | 7/2003 | Hauck et al. | | 710/107 |
| 6,603,740 B1 * | 8/2003 | Du | | 370/248 |
| 6,680,903 B1 * | 1/2004 | Moriguchi et al. | | 370/216 |
| 6,717,922 B2 * | 4/2004 | Hsu et al. | | 370/258 |
| 6,765,881 B1 * | 7/2004 | Rajakarunanayake | | 370/256 |
| 6,810,013 B1 * | 10/2004 | Rauhala | | 370/231 |
| 6,810,021 B1 * | 10/2004 | Sakurai | | 370/255 |
| 7,126,923 B1 * | 10/2006 | Yang et al. | | 370/256 |
| 2003/0012164 A1 * | 1/2003 | Mizoguchi et al. | | 370/338 |
| 2004/0008988 A1 * | 1/2004 | Gerstal et al. | | 398/45 |

* cited by examiner

*Primary Examiner*—Seema S Rao
*Assistant Examiner*—Sai-Ming Chan
(74) *Attorney, Agent, or Firm*—Blakely Sokoloff Taylor & Zafman

(57) ABSTRACT

Embodiments of the invention are generally directed to a system and method of network loop detection and recovery. In one embodiment of the invention, a networked node contains a loop detection and recovery agent. The loop detection and recovery agent may include a loop detection module and a loop recovery module. The loop detection module may be independent of a redundancy protocol implemented by the networked node. In contrast, the loop recovery module may be embedded in the redundancy protocol implemented by the networked node.

28 Claims, 7 Drawing Sheets

SYSTEM AND METHOD FOR NETWORK LOOP DETECTION AND RECOVERY

TECHNICAL FIELD

Embodiments of the invention generally relate to the field of networks and, more particularly, to a system and method for network loop detection and recovery.

BACKGROUND

FIG. 1 is a block diagram of conventional network 100. Conventional network 100 includes nodes 110, 120, and 130 which are interconnected by communication channels 140, 150, and 160. Nodes 110, 120, and 130 may be layer 2 switches, Layer 2/Layer 3 switches, bridges or the like. Communication channels 140, 150, and 160 may be unshielded twisted pair wire, coaxial cable, shielded twisted pair wire, fiber-optic cable, wireless connections, or other media suitable for interconnecting nodes.

Network 100 may use a layered architecture. A layered architecture is a hardware or software design in which the functions of one layer build upon the functions of a lower layer. Typically, each layer uses the services provided by the layer immediately below it and provides services to the layer above it. The well-known Open Systems Interconnection (OSI) reference model developed by the International Standardization Organization (ISO) is one exemplary model for layered architecture. Layer 2 of the OSI model is responsible for creating, transmitting, and receiving digitally encoded packets. From the perspective of layer 2, nodes may be identified by their Media Access Control (MAC) addresses.

Forwarding is the process of passing a packet or message on to an intermediate or final destination. Forwarding may be performed by layer 2 hardware and software modules of network 100 (layer 2 forwarding). The fundamental properties of layer 2 forwarding are flooding, learning, and aging.

Nodes typically make forwarding decisions based on a forwarding table. A forwarding table typically provides a listing of addresses with associated interfaces through which the address may be reached. When a packet is received on an interface of a node, the node reads the source address (typically a MAC address) and updates the forwarding table with an entry indicating that the source address may be reached through the interface on which the packet was received. Learning refers to the process of building a forwarding table based on information obtained from received packets. Typically a node will discard forwarding table entries that have not been updated after a predetermined period. Aging refers to monitoring the age of forwarding table entries and discarding stale entries.

The receiving node may also access the destination address of the received packet and compare that address to the forwarding table. Typically, the destination address will be one of three types: unicast, multicast, or broadcast. If the destination address is a unicast address and the node has an entry in its forwarding table that corresponds to that unicast address, then the node will forward the packet through the interface indicated by the entry in the forwarding table. If there is no entry corresponding to the unicast address then the node may forward the packet over all interfaces except the interface on which the packet was received. Flooding refers to the process of forwarding a packet over all interfaces except an interface on which a packet was received. Packets having a multicast or broadcast destination address may also be flooded.

Referring again to FIG. 1, network 100 illustrates that the process of flooding may create a network loop if more than one path exists between any two nodes in network 100. For example, node 110 may send packet 170, having an unknown unicast address to node 120. Node 120 determines that packet 170 has an unknown unicast address and sends it over all available interfaces (e.g., over communication channel 150). Node 130 similarly determines that packet 170 has an unknown unicast address and forwards the packet to node 110. Thus, a network loop occurs when a network provides alternate paths between nodes so that a flooded packet returns to the node from which it was sent.

A redundancy protocol is a protocol that provides a mechanism to control and/or prevent network loops. Examples of redundancy protocols include the IEEE 802.1D standard, 1998 Edition (ISO/IEC 15802-3:1998); the IEEE 802.1w-2001 standard, 2001 Edition; RFC 2338, "Virtual Router Redundancy Protocol," S. Knight, et al, April 1998 (VRRP); and the Extreme Standby Redundancy Protocol (ESRP). Redundancy protocols are well known by those of ordinary skill in the art. For ease of discussion, nodes are herein described as having redundancy protocols rather than having implementations of redundancy protocols.

FIG. 2 is a block diagram of network 200, illustrating how a redundancy protocol may limit the occurrence of a network loop. Network 200 includes nodes and communication channels similar to those in network 100 and those nodes and communication channels are similarly numbered. Reference numerals 215, 225, and 235 are instances of a redundancy protocol operating on nodes 210, 220, and 230 respectively. Redundancy protocols 215, 225, and 235 may communicate with each other by exchanging control packets. As is well known in the art, redundancy protocols 215, 225, and 235 may render one or more interfaces on nodes 210, 220, and 230 inactive to reduce the occurrence of network loops.

In the illustrated example of FIG. 2, interface 270 on node 220 is inactive. Since the interface on node 220 is inactive there is only one active path between any two nodes in network 200. The redundancy protocols operating on nodes 210, 220, and 230 reduce the occurrence of network loops by attempting to ensure that there is only one active path between a source node and a destination node in network 200.

A problem may occur, however, if there is a software failure or another anomaly in communication between the redundancy protocols operating on nodes 210, 220, and 230. For example, processing resources on node 210 may be too busy to generate and process the control packets that direct node 220 to maintain interface 260 in an inactive state. After a predetermined period of time, node 220 may bring interface 260 to an active state. Once interface 260 is in an active state, there will be more than one active path between each node in network 200. Therefore, network 200 will likely experience network loops.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for loop detection and recovery implemented in packet switched networks. In one embodiment, a networked node is enhanced with a loop detection and recovery agent. The loop detection and recovery agent may have a loop detection module and a loop recovery module. The loop detection module may operate independently from a redundancy protocol to determine whether a network loop exists. If a loop exists, the node may use the loop recovery module to recover from the loop. In an embodiment of the invention, the loop recovery module is embedded in a redundancy protocol operating on the node.

Figure 1:
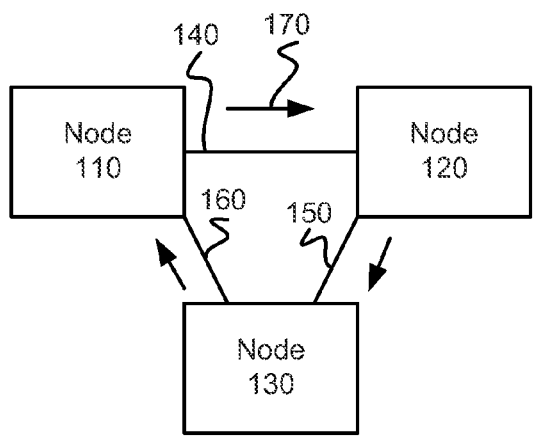
FIG. 1 is a block diagram illustrating selected elements of conventional network 100.
Figure 2:
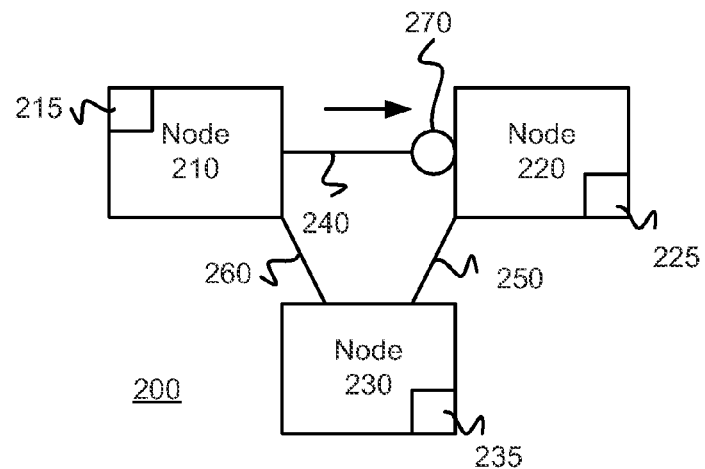
FIG. 2 is a block diagram of network 200, illustrating how a redundancy protocol may limit the occurrence of a network loop.
Figure 3:
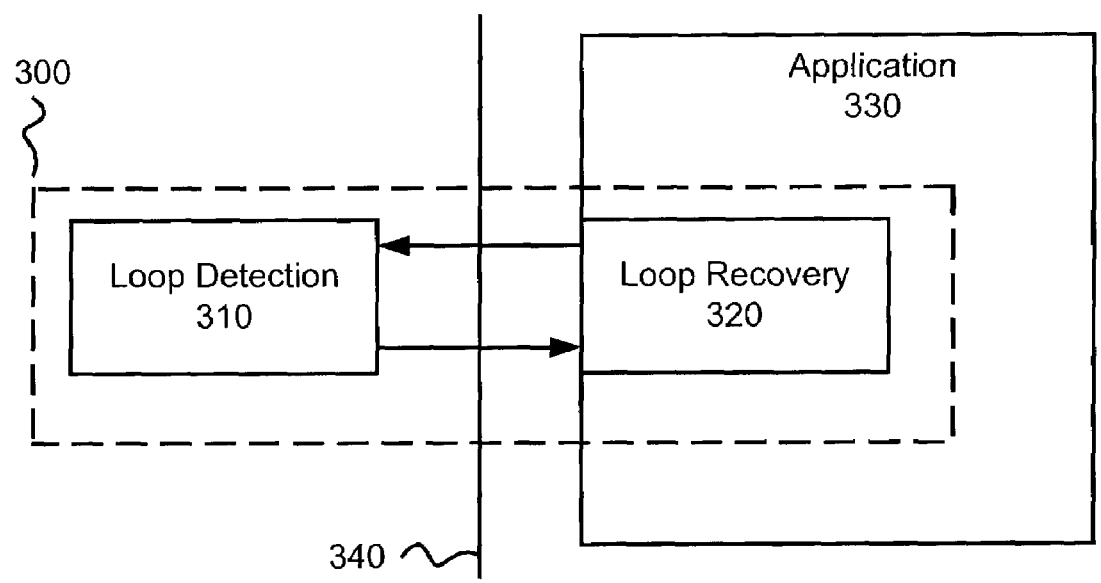
FIG. 3 is a block diagram illustrating the architecture of an embodiment of loop detection and recovery agent 300.

FIG. 3 is a block diagram illustrating the architecture of an embodiment of loop detection and recovery agent 300 (hereinafter, agent 300). The illustrated embodiment of loop detection and recovery agent 300 includes loop detection module 310 and loop recovery module 320. In an embodiment of the invention, loop detection module 310 detects network loops independently of application 330. Application 330 may be a redundancy protocol, a management process, or any application capable of assisting loop recovery 320 in preventing and recovering from loops. In some embodiments of the invention, loop recovery module 320 is embedded in application 330.

Loop detection module 310 uses loop detection packets to determine whether a network loop exists, in an embodiment of the invention. The loop detection packets may uniquely identify which node sent the packet. In an embodiment of the invention, the originating node is identified through the source address of the loop detection packet. The loop detection packets may be formatted so that nodes other than the originating node process the packet as a multicast (or broadcast) packet.

Figure 4:
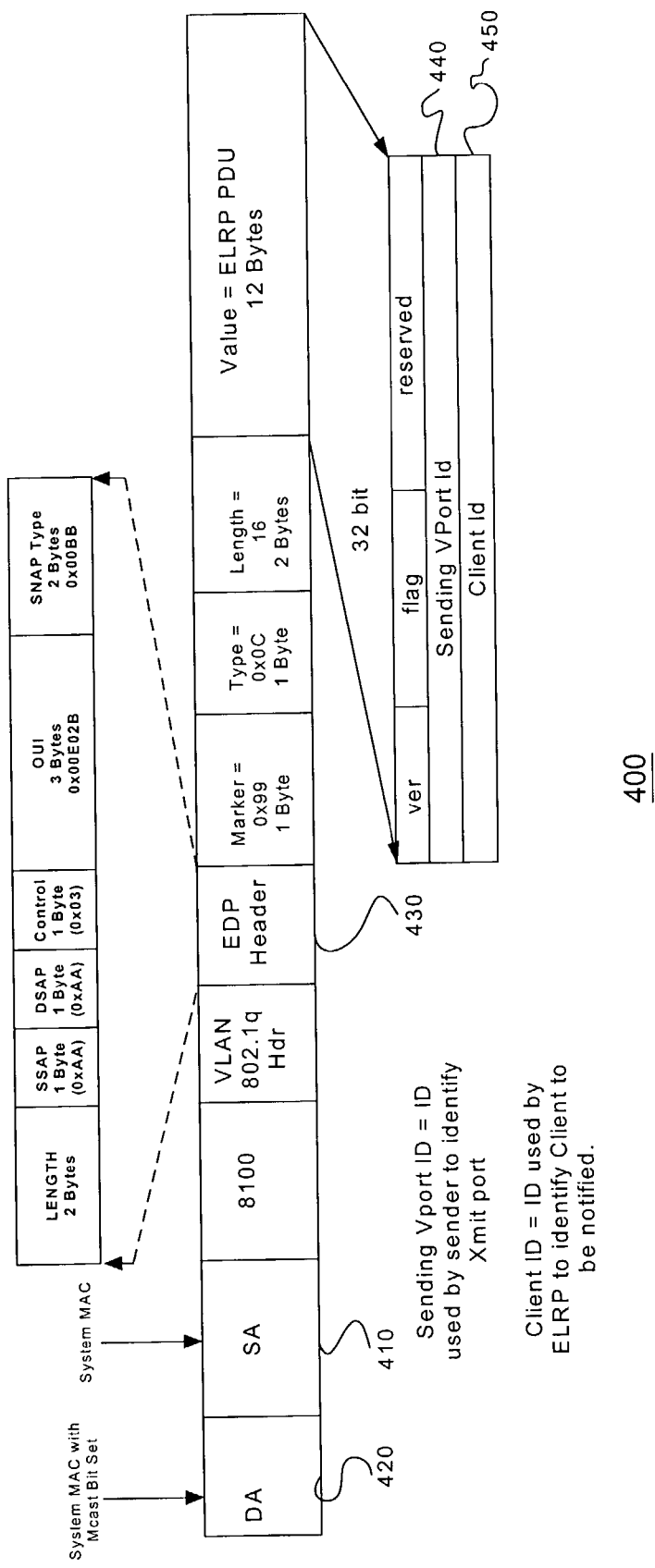
FIG. 4 illustrates loop detection packet 400 implemented according to an embodiment of the invention.

FIG. 4 illustrates loop detection packet 400 implemented according to an embodiment of the invention. In an embodiment of the invention, loop detection packet 400 may be encoded as a layer 2 Ethernet multicast (or broadcast) packet. In alternative embodiments of the invention, loop detection packet 400 may be encoded in other formats. Source address (SA) 410 may be the system Media Access Control (MAC) address of the originating node. Destination address (DA) 420 may be may be derived from the SA by setting the multicast bit within the SA. For example, if the SA is 00-01-02-03-04-05, the DA will be 01-01-02-03-04-05, in the illustrated embodiment of the invention. Embodiments of the invention encode the loop detection packets as broadcast packets because broadcast packets are flooded throughout a network. Reference numeral 430 shows that, in an embodiment of the invention, the Logical Link Control (LLC) Sub-network Access Protocol (SNAP) header for loop detection packets may be encoded with the Extreme Discovery Protocol (EDP) LLC SNAP header. Table 1 provides a description of selected Type-Length-Value (TLV) fields for the illustrated embodiment of loop detection packet 400.

TABLE 1

| Type-Length-Value (TLV) Field | Description |
| --- | --- |
| Marker | A one byte field with value 0x99 |
| Type | A one byte field with value 0x0C |
| Length | A two byte field that holds the length of TLV including the marker. |
| Ver | A one byte field holding the Extreme Loop Recovery Protocol (ELRP) version number |
| Flag | A one byte field for holding flags |
| Reserved | A two byte reserved field |

In an embodiment of the invention, loop detection packet 400 provides an indication of the packet's source port on the originating node. Reference numeral 440, for example provides a field for the source Virtual Local Area Network (VLAN) port on the originating node. If the originating node receives packet 400 it can determine which port was the source port by accessing field 440.

Packet 400 also contains field 450, in an embodiment of the invention. Field 450 may be used to identify an application (e.g., application 330) which has registered with agent 300. The identified application is the application in which the loop recovery module is embedded, in an embodiment of the invention. Agent 300 may use the information obtained from field 450 to determine which application to notify if agent 300 detects a network loop. The process of an application registering with agent 300 is further described below in connection with Table 2.

Figure 5:
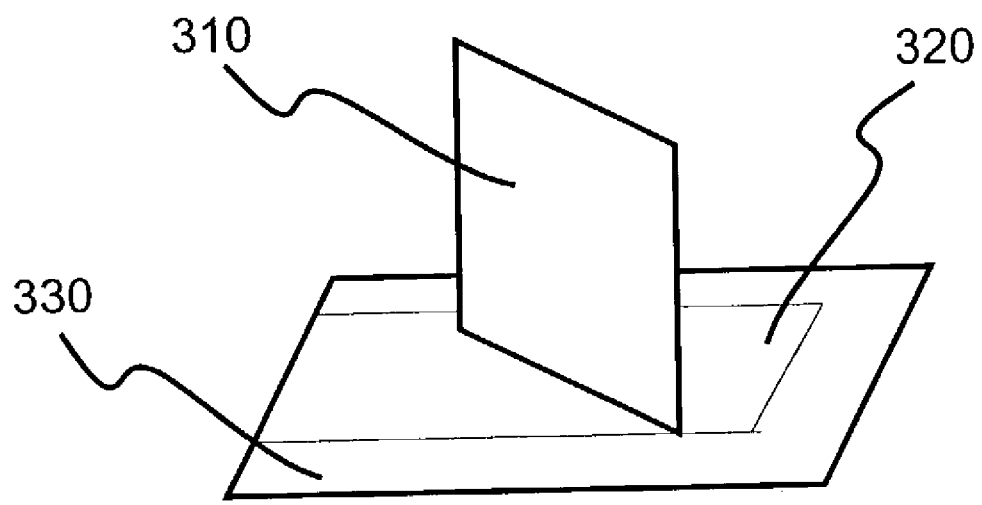
FIG. 5 is a conceptual illustration showing the relationship between loop detection and recovery agent 300 and application 330.

Loop detection module 310 is independent of application 330, in an embodiment of the invention, to increase the reliability of the node's loop detection and recovery capabilities. FIG. 5 is a conceptual illustration showing the relationship between components of agent 300 and application 330. As shown in FIG. 5, loop detection module 310 is orthogonal to (e.g., independent of) application 330. FIG. 5 also illustrates that, in an embodiment of the invention, loop recovery module 320 is embedded in application 330. As is further described below, agent 300 may be implemented as executable content, control logic, firmware, or some combination thereof.

In an embodiment of the invention, agent 300 performs a number of functions to support loop detection module 310. In embodiments of the invention wherein agent 300 is executable content, agent 300 may initialize data structures used by loop detection module 310. Agent 300 may also derive the source and destination addresses used by the loop detection packets. In an embodiment of the invention, agent 300 may program a node's forwarding tables so that loop detection packets that were sent from a node will be funneled to agent 300 when/if they return to the originating node. Agent 300 monitors application 330 for requests to perform requested services, in an embodiment of the invention. Table 2 shows a number of exemplary messages that agent 300 processes, in an embodiment of the invention.

TABLE 2

| Message | Explanation of Message | Application Program Interface (API) to support message |
| --- | --- | --- |
| Register | Request from an application to | ElrpRegClientAPI-(ClientID, Callback) |

TABLE 2-continued

| Message | Explanation of Message | Application Program Interface (API) to support message |
|---|---|---|
| | register itself as a client of agent 300. | |
| Unregister | Request from an application to remove itself from the list of agent 300's clients. | ElrpUnregClientAPI- (ClientID) |
| SendPeriodicLDPackets | This message is used by the application to request that agent 300 periodically send a loop detect packet. | ElrpStartSendAPI- (ClientID, VportList, period); // Period = 0 for one shot send. |
| SendOneShotLDPackets | This message is used by the application to request that agent 300 send a single loop detect packet. | |
| StopPeriodicLDPackets | This message is used by the application to request that agent 300 discontinue sending periodic loop detect packets. | ElrpStopSendAPI- (ClientID, VportList) |

The register message is typically the first message sent by an application to a loop detection and recovery agent. The Register message informs agent 300 that the application requests the services of agent 300. In contrast, the Unregister message may be used to inform agent 300 that the application no longer requires agent 300's services. In an embodiment of the invention, if an application sends the SendPeriodicLD-Packets message to agent 300, then agent 300 will periodically send loop detection packets until the application sends a StopPeriodicLDPackets message. The SendPeriodicLD-Packets message provides a means for an application to specify a period for the frequency of sending loop detection packets, in an embodiment of the invention. If the application sets the period to zero, then agent 300 will send a single loop detection packet, in an embodiment of the invention.

The third column of Table 2 shows a number of Application Program Interfaces (APIs) used to support the described messages. Applications may use the APIs to send messages to agent 300. In an embodiment of the invention, an application may use a ClientID field to identify which application has sent the message. Agent 300 may use the information in the ClientID field to determine which application should be notified if a loop is detected, in an embodiment of the invention. Agent 300 may invoke a callback function to notify an application that a loop has been detected. In an embodiment of the invention, the callback function may be specified by an application when it registers with agent 300.

Messages directing agent 300 to send loop detection packets may contain a list of ports from which the loop detection packets are to be sent. For example, in Table 2, the APIs supporting the SendPeriodicLDPackets and StopPeriodicLDPackets provide a VportList field. The VportList field is used to identify the virtual ports from which loop detection packets should be sent, in an embodiment of the invention. In an embodiment of the invention, agent 300 may inform a registered application of the arrival of loop detection packets and on which ports (or virtual ports) the packets arrived, using the messages and APIs shown in Table 2.

As discussed above, embodiments of agent 300 may include both loop detection module 310 and a loop recovery module 320. In an embodiment of the invention, loop recovery module 320 may be embedded in application 330 (e.g., in a redundancy protocol). One application that uses the services of agent 300 and may have an embedded loop recovery module 320 is the Extreme Standby Redundancy Protocol (ESRP).

The ESRP is similar to VRRP in that both protocols provide for a network to have one master node and a plurality of slave nodes. The master node maintains an active forwarding plane and directs the slave nodes to render their forwarding planes inactive. Master nodes may use control packets to maintain slave nodes in a slave state. Both ESRP and VRRP provide redundancy by enabling a slave node to become a master node, if the current master node becomes inoperative. VRRP merely provides redundancy at layer 3 while ESRP provides redundancy both at layer 3 and layer 2. ESRP is often employed in networks that support Virtual Local Area Networks (VLANs).

In some situations, a slave node may incorrectly conclude that a master node is inoperative. For example, processing resources on a master node may be too busy to process control packets for a period of time. If slave nodes do not receive control packets from the master node for a predetermined period, they may conclude that the master node is inoperative. If a slave node incorrectly concludes that a master node is inoperative, then it may transition to a master node state and thereby introduce a second master node to a network. A network (e.g., a LAN or VLAN) having two or more master nodes may experience network loops.

Figure 6:
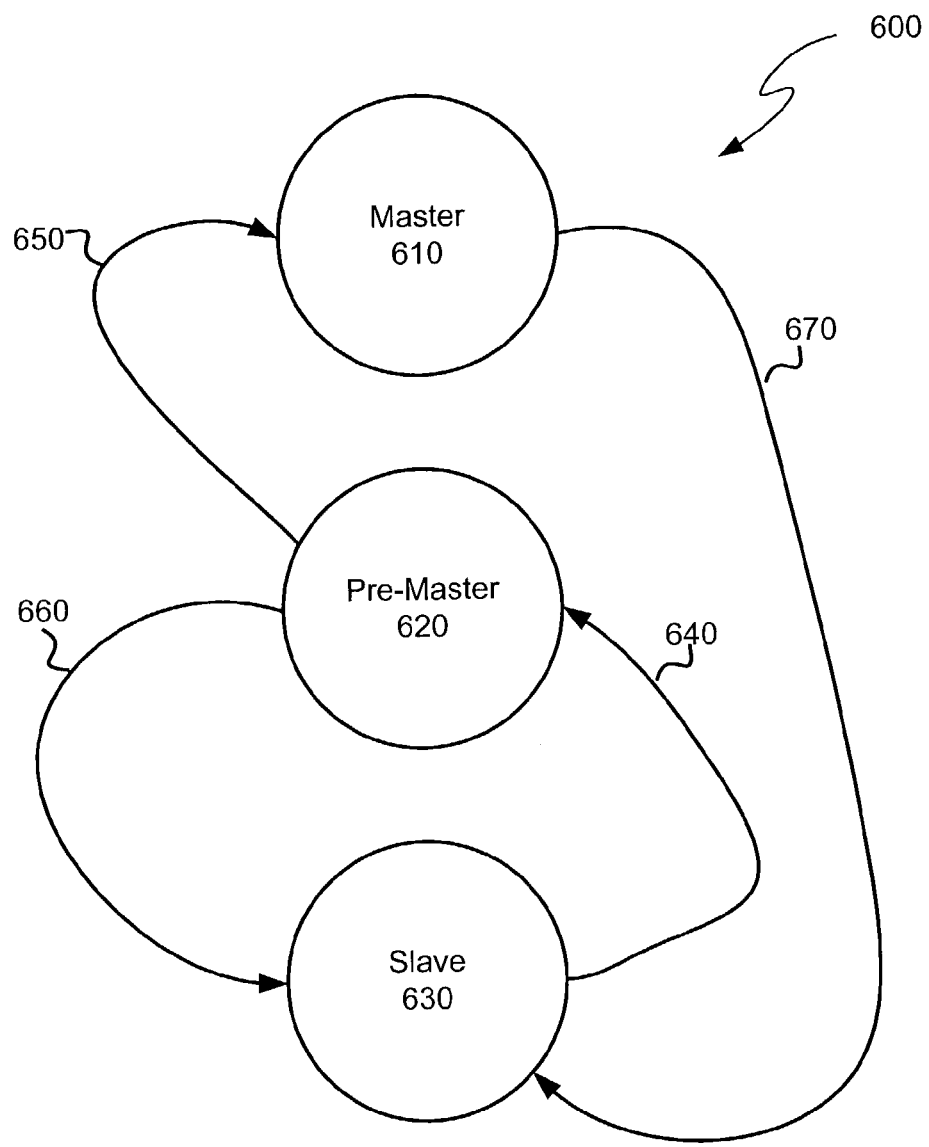
FIG. 6 is a state diagram illustrating selected states and state transitions for a node employing ESRP and the loop detection and recovery agent, according to an embodiment of the invention.

According to an embodiment of the invention, a new state is added to nodes using the services of agent 300. FIG. 6 is a state diagram illustrating selected states and state transitions for a node employing ESRP and agent 300, according to an embodiment of the invention. State diagram 600 includes master state 610, pre-master state 620, and slave state 630. As will be further described below, a node may use agent 300 to prevent and detect network loops under two distinct conditions, in an embodiment of the invention.

A node may use agent 300 to prevent and detect network loops, if it is a slave node and it concludes that the master node is inoperative. If a node is a slave node then it may be functioning in slave state 630. While in slave state 630, a slave node may periodically receive control packets from a master node. If a slave node does not receive control packets for a predetermined period of time, it may conclude that the master node is inoperative. As shown by reference numeral 640, the slave node transitions to pre-master state 620 if it concludes that the master node is inoperative, in an embodiment of the invention.

While in pre-master state 620, the node may use agent 300 to periodically send loop detection packets. The node may remain in pre-master state 620 for a predetermined period of time while it determines whether any of the loop detection packets return to the originating node. Sending loop detection packets while in pre-master state 620 allows the node to determine whether it will create any network loops if transitions to master state 610. The node may wait a predetermined period of time for the return of the loop detection packets. If the loop detection packets do not return, then the node may transition to master state 610, as shown by reference numeral 650. Alternatively, if any of the loop detection packets return to the originating node or if the originating node detects a control packet from the master node, the originating node may return to slave state 630 at reference numeral 660.

A node functioning in master state 610 (e.g., a master node) may also use the services of agent 300. For example, the master node may periodically send loop detection packets over one or more of its ports (e.g., LAN ports or VLAN ports). If the master node receives any of the sent loop detection packets on one of its ports, then the master node may conclude that a network loop exists. In an embodiment of the invention, the master node may transition to slave state 630, if it receives one (or more) of the loop detection packets that it sent, as shown by reference numeral 670. Table 3 shows a number of exemplary events and state transitions related to pre-master state 620.

TABLE 3

| | STATES | | | |
|---|---|---|---|---|
| EVENT | Neutral | Slave | Pre-Master | Master |
| My parameters are the Best | | Action 1, Pre-Master | | |
| Loop Packet Received | | Slave | Action 2, Slave | Slave |
| Pre-Master Timeout | | N/A | Action 2, Master | N/A |
| My Parameters are no Longer the Best Parameters | | Slave | Action 2, Slave | Slave |
| Time Tick | | | Action 3, Pre-master | |

Table 3 lists three distinct actions: action 1, action 2, and action 3. In an embodiment of the invention, action 1 corresponds to a message from an application directing agent 300 to send a loop detection packet over the specified ports and to start a pre-master timer. Action 2 corresponds to a message to stop the pre-master timer in an embodiment of the invention. Action 3 corresponds to a message from an application directing agent 300 to send a loop detection packet. A person of ordinary skill in the art will recognize that in alternative embodiments of the invention, a node may transition from one state to another state based on different actions. Similarly, a person of ordinary skill in the art will appreciate that a node may change states based on fewer or greater actions than those illustrated in the exemplary case shown in Table 3.

Figure 7:
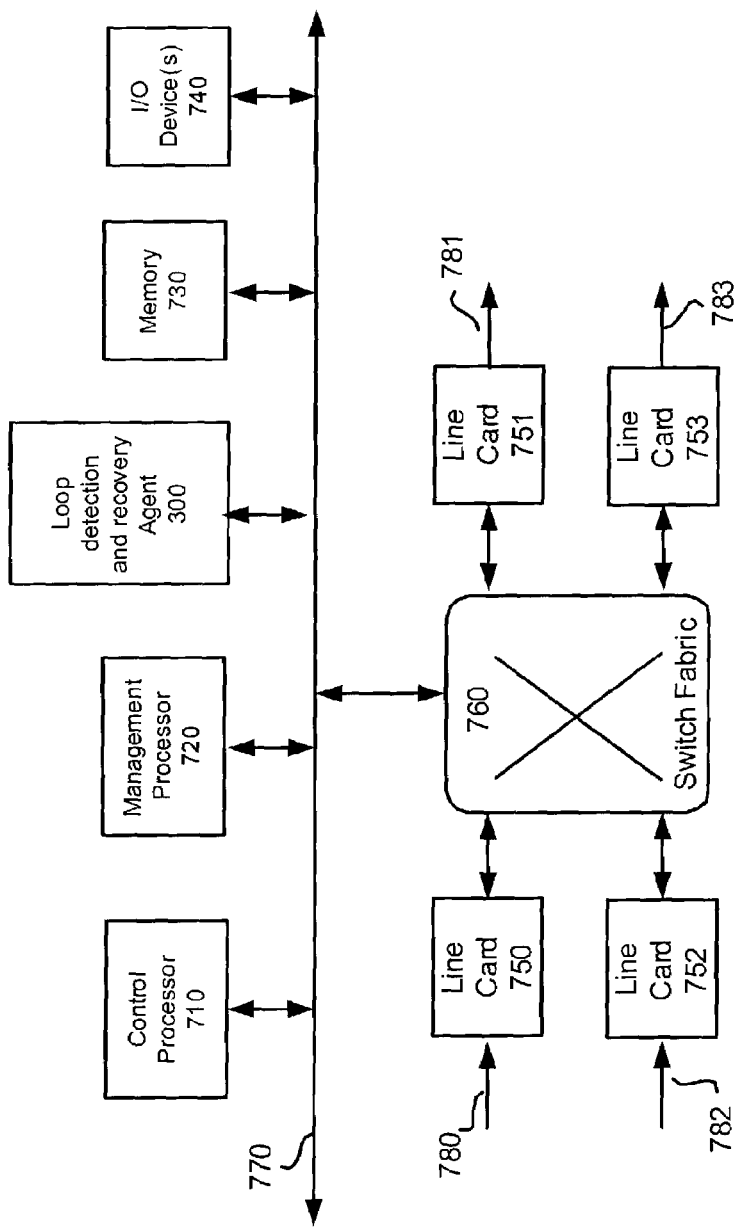
FIG. 7 is a block diagram of node 700 implemented according to an embodiment of the invention.

FIG. 7 is a block diagram of node 700 implemented according to an embodiment of the invention. Node 700 may include: one or more control processors 710, one or more management processors 720, memory 730, one or more Input/Output interfaces 740, line cards 750-753, switch fabric 760, and loop detection and recovery agent 300. The illustrated elements may be connected together through system interconnect 770. One or more control processors 710 and one or more management processors 720 may include a microprocessor, microcontroller, field programmable gate array (FPGA), application specific integrated circuit (ASIC), central processing unit (CPU), programmable logic device (PLD), and similar devices that access instructions from system storage (e.g., memory 730), decode them, and execute those instructions by performing arithmetic and logical operations. In some embodiments of the invention, one or more control processors 710 and one or more management processors 720 are implemented with a common processor or processors.

Loop detection and recovery agent 300 enables node 700 to send loop detection packets (e.g., over communication channels 781 and 783) and to determine whether those loop detection packets return to node 700 (e.g., on communication channels 780 and 782). Loop detection and recovery agent 300 may be executable content, control logic (e.g., ASIC, PLD, FPGA, etc.), firmware, or some combination thereof, in an embodiment of the invention. In embodiments of the invention in which loop detection and recovery agent 300 is executable content, it may be stored in memory 730 and executed by control processor 710.

Memory 730 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 730 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 730 may store program modules such as routines, programs, objects, images, data structures, program data, and other program modules that perform particular tasks or implement particular abstract data types that facilitate system use.

Line cards 750-753 provide an interface between communication channels 780-783 and other elements of node 700. Line cards 750-753 represent a broad range of interface elements capable of providing transmitting and/or receiving ports connecting node 700 to communication channels 780-783. A person of ordinary skill in the art will appreciate that the number of line cards in node 700 may be fewer or greater than the number shown in FIG. 7.

Switch fabric 760 provides the interconnect architecture used to switch packets from incoming communication channels (e.g., 780 and 782) with outgoing communication channels (e.g., 781 and 783). Switch fabric 760 represents a wide array of interconnect architectures capable of packet switching. Switch fabrics are well known in the art and, therefore, will not be further described except as to embodiments of the invention.

One or more I/O interfaces 740 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnect 770 permits communication between the various elements of node 700. System interconnect 770 may include a wide variety of signal lines including one or more of a memory bus, peripheral bus, local bus, host bus, bridge, optical, electrical, acoustical, and other propagated signal lines.

Figure 8:
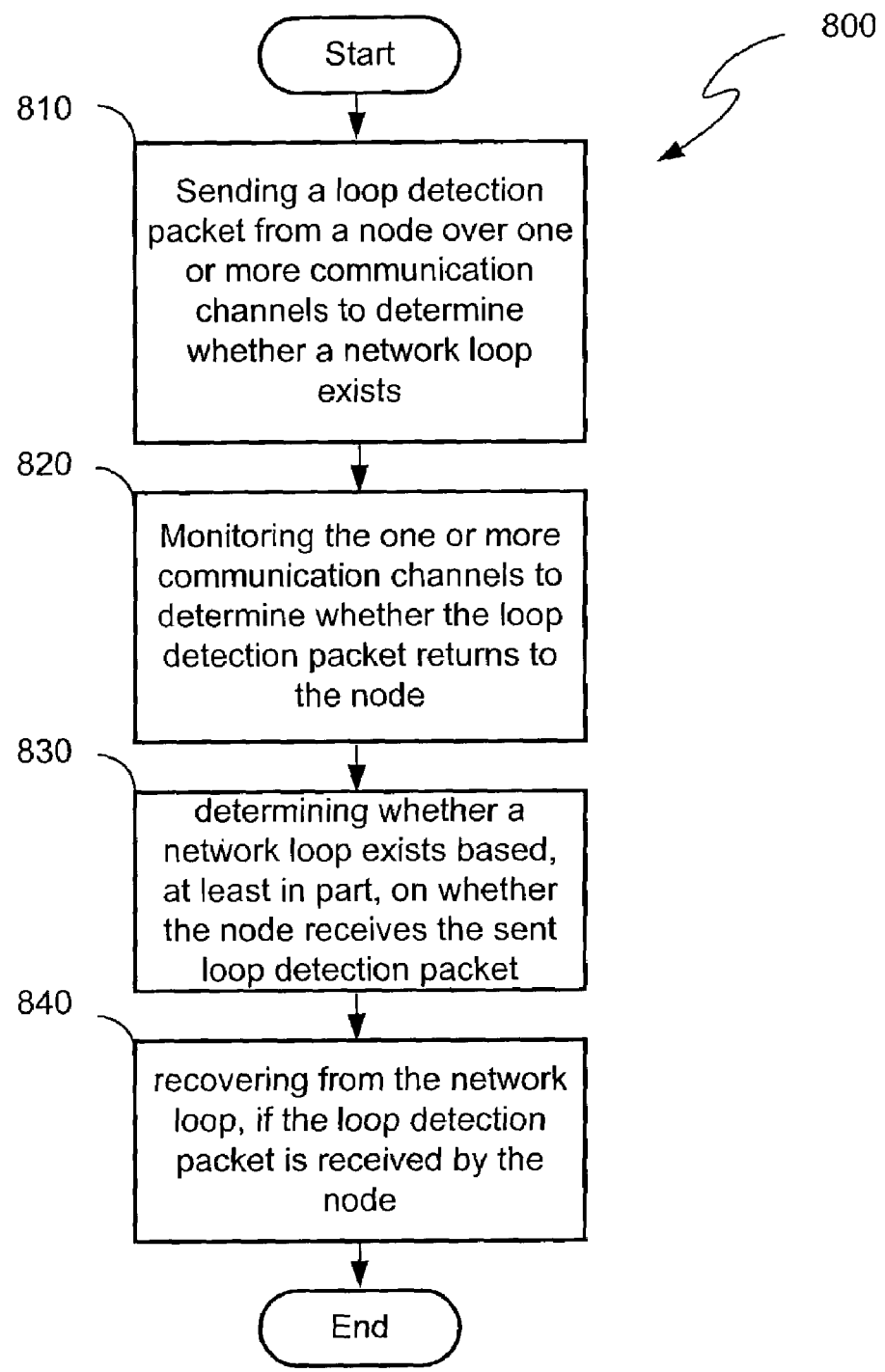
FIG. 8 is a flow diagram illustrating certain aspects of a method for loop detection and loop recovery according to an embodiment of the invention.

Turning now to FIG. 8, the particular methods associated with embodiments of the invention are described in terms of computer software and hardware with reference to a flowchart. The methods to be performed by a loop detection and recovery agent may constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a node) executing the instructions from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 8 is a flow diagram 800 illustrating certain aspects of a method for loop detection and loop recovery according to an embodiment of the invention. Referring to process block 810, in an embodiment, a node (e.g., node 700) sends a loop detection packet over one or more communication channels to determine whether a network loop exists. The loop detection packet is uniquely identified as a loop detection packet originating from the sending node, in an embodiment of the invention. For example, the loop detection packet may be a layer 2 broadcast packet having a source address that is a Media Access Control address of the originating node.

Referring to process block 820, the node may monitor one or more communication channels (e.g., communication channels 780 and 782 shown in FIG. 7) to determine whether one or more of the sent loop detection packet returns to the originating node. In an embodiment of the invention, the node monitors incoming packets to determine whether an arriving packet has a source address that is the same as a MAC address of the node. Referring to process block 830, the node may determine whether a network loop exists based, at least in part, on whether the node receives a loop detection packet that the node identifies as being one of the loop detection packets that it previously sent. In an embodiment of the invention, the node determines that a network loop exists, if the node receives a loop detection packet that it previously sent within a predetermined period of time.

If the node determines that a network loop exists, the node may recover from the network loop at process block 840. In an embodiment of the invention in which the node employs the ESRP, the node may recover from the network loop by transitioning from a pre-master state (or a master state) to a slave state. In an alternative embodiment of the invention in which the node employs the IEEE 802.1D standard, the node may recover from the network loop by blocking one or more ports.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
exchanging network communications by a first node in a plurality of nodes, the first node having a loop recovery service module for recovering from a network loop and a loop detection service module providing services to, and operating independent of, the loop recovery service module, the plurality of nodes having
a master node maintaining a forwarding plane in an active state, and
one or more slave nodes controlled by the master node, wherein the master node directs the one or more slave nodes to maintain another forwarding plane in an inactive state;
with a memory device and a processor of the first node, operating the first node in a slave state wherein the first node is one of the one or more slave nodes of the plurality of nodes, wherein the first node is controlled by a second node operating as the master node of the plurality of nodes;
during the first node operating in the slave state, the first node determining that a control packet has not been received from the second node;
in response to the determining that the control packet has not been received, the first node transitioning from the slave state to a pre-master state; and
during the first node operating in the pre-master state:
sending a loop detection packet from the loop detection service of the first node over one or more communication channels; and
if a control packet from the second node is received by the first node, then transitioning the first node from operating in the pre-master state to operating in the slave state;
if the loop detection service module of the first node determines, based on whether the sent loop detection packet returns to the first node, that the network loop exists, then transitioning the first node from operating in the pre-master state to operating in the slave state; and
if no control packet is received by the first node from the second node and no loop detection packet returns to the first node, then transitioning the first node from operating in the pre-master state to operating in a master state wherein the first node is the master node of the plurality of nodes.

2. The method of claim 1, wherein sending a loop detection packet from the first node comprises sending a loop detection packet that is uniquely identified as a loop detection packet originating from the first node.

3. The method of claim 2, wherein sending a loop detection packet that is uniquely identified as a loop detection packet originating from the first node comprises sending a layer 2 broadcast packet having a source address that is a Media Access Control (MAC) address of the first node.

4. The method of claim 1, wherein determining whether the sent loop detection packet returns to the first node comprises monitoring packets arriving on one or more communication channels to determine whether an arriving packet has a source address that is the same as a MAC address of the first node.

5. The method of claim 1, further comprising recovering from a network loop, if the loop detection packet is received by the first node.

6. The method of claim 5, wherein recovering from the loop comprises informing an implementation of a redundancy protocol that a network loop exists.

7. The method of claim 6, wherein recovering from the loop comprises implementing a spanning tree algorithm to establish a single active path from the first node to another node.

8. The method of claim 7, further comprising:
monitoring the one more communication channels for a hello packet sent by the redundancy protocol;
wherein sending a loop detection packet from a node over a communication channel comprises sending a loop detection packet, if the hello packet is not detected on the one or more monitored communication channels during a predetermined length of time; and
wherein recovering from the loop comprises maintaining a forwarding plane in an inactive state.

9. The method of claim 8, wherein the redundancy protocol complies with the IEEE 802.1D standard, 1998 edition (ISO/IEC 15802-3: 1998).

10. The method of claim 8, wherein the redundancy protocol complies with the Extreme Standby Redundancy Protocol.

11. A node comprising:
processing resources;
a redundancy protocol to exchange network communications in a plurality of nodes having
 a master node maintaining a forwarding plane in an active state, and
 one or more slave nodes controlled by the master node, wherein the master node of the plurality of nodes exchanges a control packet directing the one or more slave nodes of the plurality of nodes to maintain another forwarding plane in an inactive state; and
a loop detection and recovery agent including a loop detection module and a loop recovery module, the loop detection and recovery agent to determine, while the first node is operating in a slave state wherein the first node is one of the one or more slave nodes, that a control packet has not been received from a second node operating as the master node of the plurality of nodes, the loop detection and recovery agent further to transition the first node from operating in the slave state to operating in a pre-master state in response to the determining that the control packet has not been received, wherein during the first node operating in the pre-master state,
 the loop detection module to send a loop detection packet from the first node,
 if a control packet is received at the first node from the second node, then the loop detection and recovery agent to transition the first node from operating in the pre-master state to operating in the slave state,
 if the loop detection service module determines, based on a return of the sent loop detection packet to the first node, that a network loop exists, then the loop detection and recovery agent to transition the first node from operating in the pre-master state to operating in the slave state, and
 if no control packet is received at the first node from the second node and no loop detection packet returns to the first node, then the loop detection and recovery agent to transition the first node from operating in the pre-master state to operating in a master state wherein the first node is the master node of the plurality of nodes;
the loop recovery module to interface between the loop detection module and the management processor, the loop recovery module to recover from a detected network loop, wherein the loop detection module is independent of the loop recovery module and provides loop detection services to the loop recovery module.

12. The node of claim 11, further comprising a loop recovery module to interface between the loop detection module and the redundancy protocol.

13. The node of claim 12, wherein the loop recovery module is embedded in the redundancy protocol.

14. The node of claim 13, wherein the redundancy protocol conforms with the IEEE 802.1D standard, 1998 edition (ISO/IEC 15802-3: 1998).

15. The node of claim 13, wherein the redundancy protocol conforms with the Extreme Standby Redundancy Protocol.

16. A network comprising:
a plurality of nodes having
 a master node to maintain a forwarding plane in an active state, and
 one or more slave nodes controlled by the master node, wherein the master node directs the one or more slave nodes to maintain another forwarding plane in an inactive state; and
a communication channel coupling a first node of the plurality of nodes with a second node of the plurality of nodes, the second node including a loop detection and recovery agent having a loop detection module to detect a network loop and a loop recovery module;
wherein the first node to operate as the master node while the second node operates in a slave state as one of the one or more slave nodes;
wherein the loop detection and recovery agent to determine, while the second node is operating in the slave state, that a control packet has not been received from the first node;
wherein the loop detection and recovery agent further to transition the second node from operating in the slave state to operating in a pre-master state in response to the determining that the control packet has not been received;
wherein during the second node operating in the pre-master state:
 the loop detection module to send a loop detection packet over the communication channel;
 if a control packet is received at the second node from the first node, then the loop detection and recovery agent to transition the second node from operating in the pre-master state to operating in the slave state,
 if the loop detection service module determines, based on a return of the sent loop detection packet to the second node, that the network loop exists, then the loop detection and recovery agent to transition the second node from operating in the pre-master state to operating in the slave state, and
 if no control packet is received at the second node from the first node and no loop detection packet returns to the second node, then the loop detection and recovery agent to transition the second node from operating in the pre-master state to operating in a master state wherein the second node is the master node of the plurality of nodes;
wherein the loop recovery module to recover from the network loop, wherein the loop detection module is independent of, and provides loop detection services to, the loop recovery module.

17. The network of claim 16, wherein the loop recovery module is embedded in a redundancy protocol, the loop recovery module to provide an interface between the redundancy protocol and the loop detection module.

18. The network of claim 17, wherein the redundancy protocol complies with the IEEE 802.1D standard, 1998 edition (ISO/IEC 15802-3: 1998).

19. The network of claim 17, wherein the redundancy protocol complies with the Extreme Standby Redundancy Protocol.

20. The network of claim 16, wherein the loop detection packet is uniquely identified as a loop detection packet originating from the second node.

21. The network of claim 20, wherein the loop detection packet is layer 2 broadcast packet having a source address that is a Media Access Control (MAC) address of the second node.

22. An article of manufacture comprising:
a computer readable medium to provide instructions that, when executed by an apparatus, cause the apparatus to exchange network communications by a first node in a plurality of nodes, the first node having a loop recovery service module for recovering from a network loop and a loop detection service module providing services to, and operating independent of, the loop recovery service module, the plurality of nodes having
a master node maintaining a forwarding plane in an active state, and
one or more slave nodes controlled by the master node, wherein the master node directs the one or more slave nodes to maintain another forwarding plane in an inactive state;
operate the first node in a slave state wherein the first node is one of the one or more slave nodes of the plurality of nodes, wherein the first node is controlled by a second node operating as the master node of the plurality of nodes;
determine, while the first node operates in the slave state, that a control packet has not been received by the first node from the second node;
in response to the determining that the control packet has not been received, transition the first node from operating in the slave state to operating in a pre-master state;
while the first node operates in the pre-master state:
send a loop detection packet from the loop detection service of the first node over one or more communication channels; and
if a control packet from the second node is received by the first node, then transition the first node from operating in the pre-master state to operating in the slave state,
if the loop detection service module of the first node determines, based on whether the sent loop detection packet returns to the first node, that a network loop exists, then transition the first node from operating in the pre-master state to operating in the slave state, and
if no control packet is received by the first node from the second node and no loop detection packet returns to the first node, then transition the first node from operating in the pre-master state to operating in a master state wherein the first node is the master node of the plurality of nodes.

23. The article of manufacture of claim 22, wherein the instructions that cause the apparatus to send the loop detection packet comprise instructions that cause the apparatus to send a loop detection packet that is uniquely identified as a loop detection packet originating from the first node.

24. The article of manufacture of claim 23, wherein the loop detection packet that is uniquely identified as a loop detection packet originating from the node comprises a layer 2 broadcast packet having a source address that is a Media Access Control (MAC) address of the node.

25. The article of manufacture of claim 22, wherein the determining whether the sent loop detection packet returns to the first node comprises monitoring packets arriving on one or more communication channels to determine whether an arriving packet has a source address that is the same as a MAC address of the first node.

26. The article of manufacture of claim 22, wherein the electronically accessible medium provides further instructions that, when executed by an apparatus, cause the apparatus to recover from a network loop, if the loop detection packet is received by the first node.

27. The article of manufacture of claim 26, wherein the instructions that cause the apparatus to recover from a network loop comprise instructions that cause the apparatus to inform an implementation of a redundancy protocol that a network loop exists.

28. The article of manufacture of claim 26, wherein the instructions that cause the apparatus to inform an implementation of a redundancy protocol that a network loop exists comprise instructions that cause the redundancy protocol to implement a spanning tree algorithm to establish a single active path from the first node to another node.

* * * * *